(12) United States Patent
Lecha et al.

(10) Patent No.: US 7,899,809 B2
(45) Date of Patent: Mar. 1, 2011

(54) METHOD AND SYSTEM FOR QUERYING A MULTIMEDIA DATABASE FROM A TELECOMMUNICATION TERMINAL

(75) Inventors: Victor Peral Lecha, Trebeurden (FR); Laurent Biettron, Lannion (FR)

(73) Assignee: France Télécom, Paris (FR)

( * ) Notice: Subject to any disclaimer, the term of this patent is extended or adjusted under 35 U.S.C. 154(b) by 291 days.

(21) Appl. No.: 10/988,995

(22) Filed: Nov. 15, 2004

(65) Prior Publication Data

US 2005/0154721 A1    Jul. 14, 2005

(30) Foreign Application Priority Data

Nov. 13, 2003   (FR) ..................... 03 13297

(51) Int. Cl.
*G06F 7/00* (2006.01)
(52) U.S. Cl. ......................................... 707/713
(58) Field of Classification Search .............. 707/3, 713
See application file for complete search history.

(56) References Cited

U.S. PATENT DOCUMENTS 5,918,225 A * 6/1999 White et al. .............. 707/3
6,347,313 B1 * 2/2002 Ma et al. .................. 707/3

FOREIGN PATENT DOCUMENTS

| EP | 1197951 | 4/2002 |
|---|---|---|
| WO | 0152161 | 7/2001 |
| WO | 0169427 | 9/2001 |

OTHER PUBLICATIONS

Attwater et al., "Large-vocabulary data-centric dialogues", BT Technol. J. vol. 17, No. 1, Jan. 1999, pp. 149-159, XP-000824588.
Rapport de Recherche Preliminaire for FR 0314178, date d'achevement de la recherché Jun. 18, 2004 (3 pages).
Gall et al., "Promondia: a Java-based framework for real-time group communication in the Web", Computer Networks and ISDN Systems, North Holland Publishing, Amsterdam, NL, vol. 29, No. 8-13, Sep. 1, 1997, pp. 917-926.
Pollock, "A Rule-Based Message Filtering System", ACM Transactions on Office Information Systems, vol. 6, No. 3, Jul. 1, 1988, pp. 232-254.

* cited by examiner

*Primary Examiner* — Apu M Mofiz
*Assistant Examiner* — Ajith Jacob
(74) *Attorney, Agent, or Firm* — Meyertons, Hood, Kivlin, Kowert & Goetzel, P.C.; Eric B. Meyertons

(57) ABSTRACT

A multimedia database is queried using an iterative step in which, at the current iteration, a portion retrieved from the database is determined using an ordered set of query criteria worked out at the previous iteration or at a previous initialization step if the current iteration is the first iteration, and using a criteria vector comprising characteristic values of a predetermined set of query criteria for the portion retrieved from the database. The criteria vector is initialized at the initialization step if the current iteration is the first iteration, and determined during the previous iteration otherwise.

15 Claims, 2 Drawing Sheets

METHOD AND SYSTEM FOR QUERYING A MULTIMEDIA DATABASE FROM A TELECOMMUNICATION TERMINAL

BACKGROUND OF THE INVENTION

1. Field of the Invention

The invention relates to the field of information technologies, and more specifically the field of man-machine interfaces (MMIs) in a multimodal access environment, i.e. access to a multimedia database via several modes, for example keyboard mode and/or voice mode and/or graphical mode. The present invention relates more specifically to a method and a device for querying a multimedia database from a telecommunication terminal.

2. Description of the Relevant Art

"Multimedia database" is understood to mean a database having records with fields that may contain or refer to multimedia data such as text, sound, pictures or video. In other words, in a multimedia database, many types of digital data can be used simultaneously.

Many services offer users the possibility of obtaining information by accessing databases. These applications may be completely loaded in fixed or mobile telecommunication terminals, or distributed over various networked platforms.

Often, after a user has submitted a query for information through an application implementing a service, the number of responses to the request reflecting the query is too large. Hence, a number of problems arise, for example displaying problems. Some applications therefore suggest that the user refine their query by submitting a new query for information based on criteria for querying the database other than those used before. These criteria are predetermined and cannot be relied upon to rapidly decrease the number of responses to a database query.

In the prior art, applications exist that aim to improve the reduction in the number of records in response to a database query, by successive requests varying the database query criteria.

For example, patent application EP 1 197 951 discloses a voice recognition system estimating recognition scores to assess the similarity between the spoken phrase and the models in a dictionary. This document applies only in a voice context and not a multimodal context.

Patent application WO 01/69427 relates to information searches using natural spoken language as input and with a multimodal return of information, but makes no mention of a method of automatic choice of database query criteria.

Thus, in view of the above, the subjects of the invention are a method and a system for reducing the number of results obtained, possibly down to a single result, from a query of a multimedia database.

SUMMARY OF THE INVENTION

Also, according to the invention, a method is proposed for querying a multimedia database from a telecommunication terminal. The database is queried using an iterative step in which, at the current iteration, a portion retrieved from the database is determined using an ordered set of query criteria worked out at the previous iteration or at a previous initialization step if the current iteration is the first iteration, and using a criteria vector comprising characteristic values of a predetermined set of query criteria for the portion retrieved from the database. The criteria vector is initialized at the initialization step if the current iteration is the first iteration, and determined during the previous iteration otherwise. The query criteria are determined so as to reduce the number of responses supplied at successive iterations respectively.

Query criteria for a portion retrieved from the database are determined so as to optimize convergence of the database query towards a small number of results.

In a preferred implementation, the elements of the ordered set of query criteria are selected from the components of the criteria vector, the number of elements selected being less than or equal to a predetermined number.

In an advantageous implementation, the said initialization step includes steps in which: the criteria vector, to which is assigned the value of a predetermined vector, is initialized; the portion retrieved from the database, to which is assigned the complete database, is initialized; and the ordered set of query criteria, to which ordered set is assigned the value of an ordered set that is a function of the initialized criteria vector, is initialized.

In a preferred implementation, at the iterative step of querying the database, before determining the ordered set of query criteria needed for the possible subsequent iteration, the portion retrieved from the database is queried, and in response, a new portion retrieved from the database is obtained.

In an advantageous implementation, at the current iteration, a query is made based on information supplied by a telecommunication terminal user, in response to a prompt for information depending on the said ordered set of query criteria.

In a preferred implementation, the prompts for information and the corresponding responses are executed in any mode from a predetermined set of information exchange modes. Each mode in the predetermined set of modes uses means capable of comparing the information supplied by the user and the values of the predetermined query criteria for the records in the portion retrieved from the database.

In an advantageous implementation, the information exchange modes include a voice mode and/or a graphical mode and/or a text mode.

In a preferred implementation, the iterative step is completed when the number of responses to the current iteration, which is the number of records in the portion retrieved from the database, is less than or equal to a predetermined maximum number, or when the ordered set of query criteria is empty.

In an advantageous implementation, at each iteration, the ordered set of query criteria is determined, for a possible subsequent iteration, from the criteria vector made up of characteristic criteria components. A component represents a criterion and comprises: a priority level for proposing the criterion represented; a list of identifiers of fields of the database forming the query criterion represented; a boolean that determines whether the criterion represented can be used at the current iteration; a boolean that determines whether the criterion represented can be used at any iteration; a hash table in which each unique value of the criterion represented, from the records in the portion retrieved from the database, is associated with the number of records in which this value appears; a total number of appearances of values of the criterion appearing several times in the portion retrieved from the database; and a probability of ambiguity of choice by the user equal to the ratio of the total number of ambiguous values to the total number of values of the portion retrieved from the database.

In a preferred implementation, the criteria of the said ordered set of query criteria have a probability of ambiguity of choice less than or equal to a predetermined maximum probability of ambiguity.

According to the invention, there is also proposed a system for querying a multimedia database, from a telecommunication terminal. The system includes a content platform supporting the said database, and a plurality of independent platforms each dedicated to a particular data exchange mode, the elements of the system having means for communicating with each other.

In a preferred embodiment, the system additionally includes an application platform supporting an application querying the said database using a method described above, the said application platform having means for communicating with the other elements of the system. It also includes iterative means of determining a portion retrieved from the database using an ordered set of query criteria worked out at the previous iteration or at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration otherwise. The query criteria are determined so as to reduce the number of responses supplied at successive iterations respectively.

BRIEF DESCRIPTION OF THE DRAWINGS

Other aims, features and advantages of the invention will become apparent on reading the following description given only by way of non-limiting example and with reference to the accompanying drawings in which.

Figure 1:
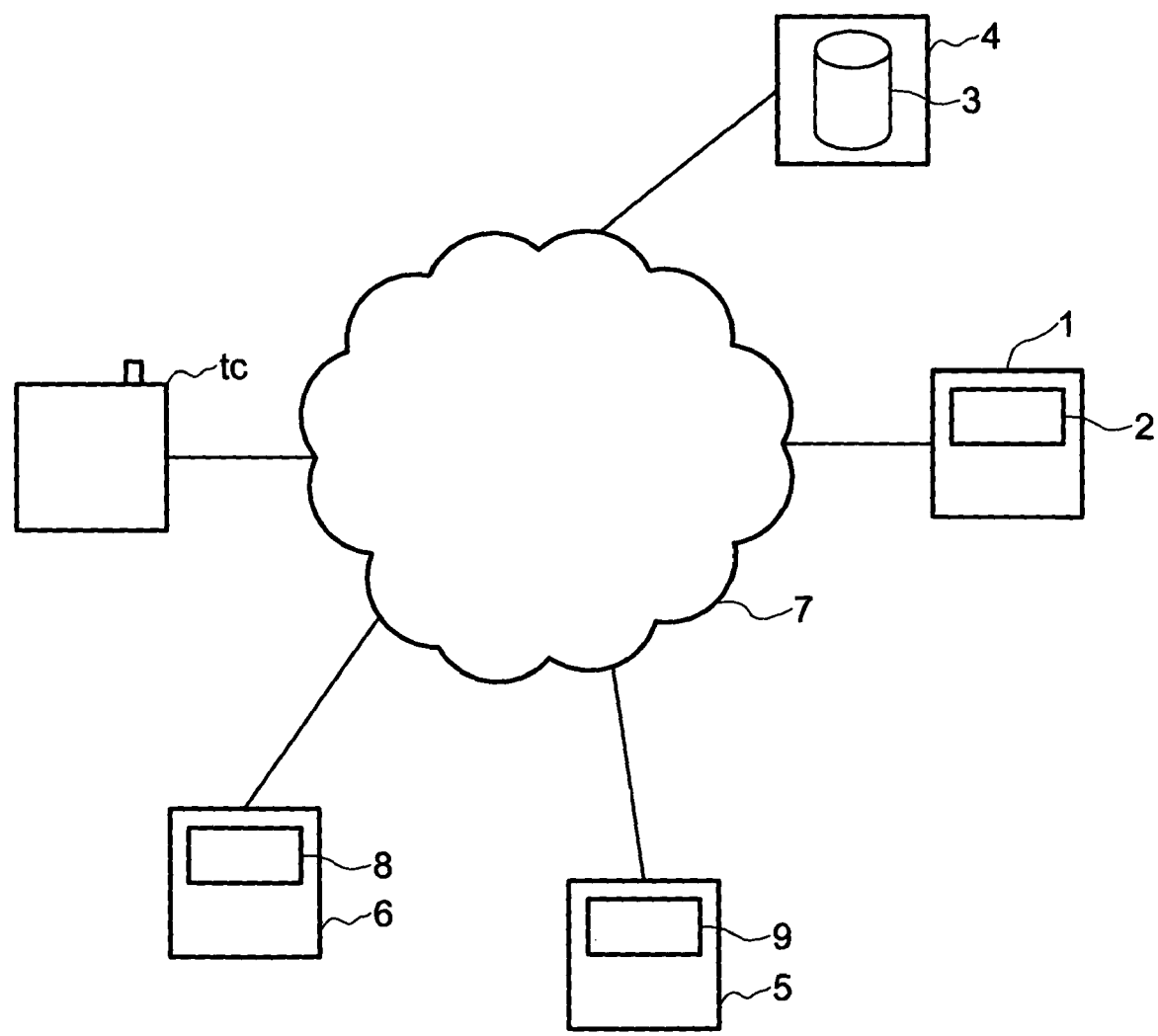
FIG. 1 illustrates one embodiment of a system according to one aspect of the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 represents a system for querying a database, which system is made up of a telecommunication terminal tc, an application platform 1 supporting an application 2 that implements a service requiring data stored in a database 3 hosted on a content platform 4. The system also includes a graphical platform 5 and a voice platform 6. All the platforms and the telecommunication terminal tc communicate over a communication network 7. Clearly "telecommunication terminal" is understood to mean a mobile telephone, a personal digital assistant, a computer connected to a communication network, or any other device that can communicate over a communication network. These platforms may be hardware or software platforms, and the application platform may even be a software platform loaded in the user's telecommunication terminal tc. Clearly, if other information exchange modes are used, each additional mode will have a dedicated platform with a recognition grammar for the specific mode, as in the modes represented. Here, the voice platform 6 and the graphical platform 5 have respective means 8 and 9 for applying their respective grammars. The voice platform 6 and graphical platform 5 may also be loaded in the telecommunication terminal tc. The platforms mentioned may therefore be completely loaded, partially loaded, or not loaded in the terminal tc. This also applies to any additional platforms dedicated to other information exchange modes. A grammar for an information exchange mode is used to translate an item of information from this mode into an equivalent encoded piece of information, as though the information had been entered via a keyboard, in a text mode. Of course, the telecommunication terminal tc is capable of operating a text mode, via a keyboard, a virtual keyboard, a mobile telephone keypad, or any other device using a text mode.

To use a service, the user of a telecommunication terminal tc links up with the application platform 1. Of course, the application may be directly loaded in the telecommunication terminal tc. At some time, this application would need to query a database, depending on the service needed. This query may require the use of an identifier and a password in the case of confidential data. The selected database is then queried in an iterative manner so as to optimize convergence of the database query towards a small number of results. Depending on the information exchange mode chosen by the user from a group of predetermined modes, before each query of a portion retrieved from the database, the data communicated by the user is translated using a suitable grammar into the usual encoded data of computer systems. For example, if the user conveys information in voice mode, then this data is translated by the means 8 of the voice platform 6 into data encoded in the usual way, as though the data had been entered by keyboard.

Figure 2:
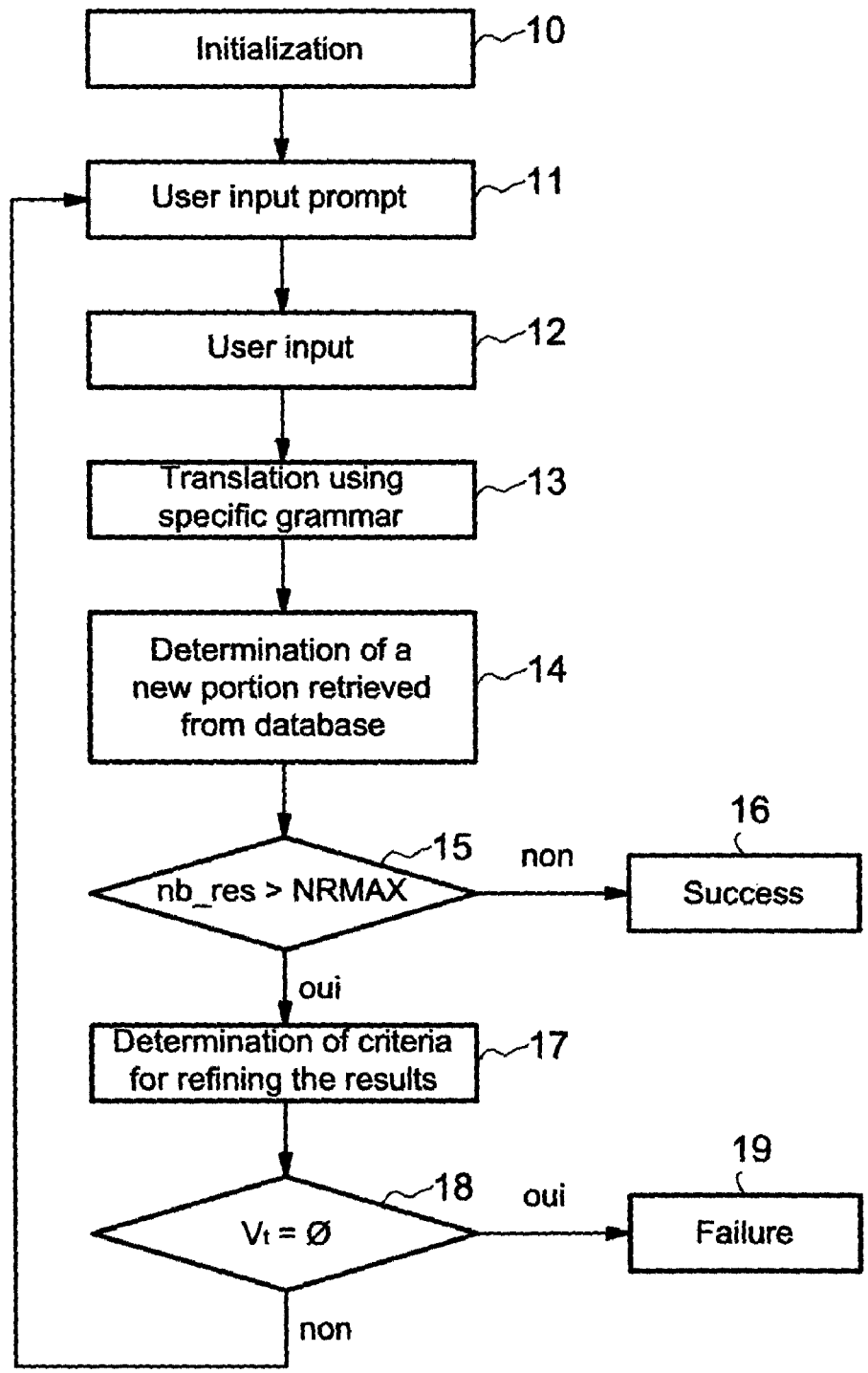
FIG. 2 illustrates the method of the system according to one aspect of the invention.

FIG. 2 illustrates the method according to one aspect of the invention. An initialization step 10 is followed by an iterative query of the database 3. This iterative query consists of, in succession, a step 11 prompting for data input by the user of a telecommunication terminal tc as represented in FIG. 1, a step 12 of data input by the user, a step 13 for translating the user-entered data by means of a specific grammar for the data exchange mode used, and a step 14 for determining a portion retrieved from the database based on an ordered set of query criteria (Vt) worked out at the previous iteration or at a previous initialization step if the current iteration is the first iteration. The iterative query also includes a step 15 for testing whether the number of results nb_res supplied at step 14 is greater than a predetermined maximum number NRMAX. If the test is negative, i.e. if the number of results nb_res is less than or equal to the predetermined maximum number NRMAX, the procedure continues with a step 16 reflecting a successful database query and therefore an end to the iterations. If the test is positive, i.e. if the number of results nb_res is greater than the predetermined maximum number NRMAX, the procedure continues with a step 17 for determining an ordered set of criteria Vt to refine the results. A step 18 for testing whether the ordered set of criteria Vt is empty is then executed. If the result of the test is positive, i.e. if the ordered set of criteria Vt is empty, a database query failure step 19 is executed. Otherwise, if the ordered set of criteria Vt contains at least one criterion, the process moves on to the next iteration by looping back to step 11 prompting for data input by the user of the telecommunication terminal tc.

Each of these steps will now be detailed theoretically and then the steps will be applied to a practical example.

At the initialization step 10, the database which the user will consult through an application implementing a service being accessed is determined. If necessary, the database may be determined via an identifier and a password, if the data is confidential. The data depends on the service offered, and so may represent a contact in an address book, a database of musical works in which database an attempt may be made to recognize a list of pieces resembling an item sung by the user, or indeed any other type of data useful for a service.

A criteria vector Vcr is initialized, comprising characteristic values of a predetermined set of query criteria for the portion retrieved from the database, with a predetermined criteria vector Vcr_init. The components of the criteria vector have the following structure:

(Priority; Lif; Usable; Alw_Usable; Hv; N_app)

where:

"Priority" is an integer that determines the order of priority for proposing the criterion;

"Lif" is a list of identifiers of fields of the database forming the query criterion;

"Usable" is a boolean number that determines, during the iterations, whether the criterion can still be used;

"Alw_Usable" is a boolean number that determines whether the criterion can always be used, at each iteration, if it is desired that a criterion remains usable all the time;

"Hv" is a hash table in which each unique value of the criterion from the records is associated with the number of occurrences of this value. The function for determining whether two values are different depends on the type of application and on the data exchange mode used; for example, in the case of a voice-executed selection of an entry in an address book, two criteria are identical if their phonetic forms are identical;

"N_app" is the total number of appearances of values of the criterion appearing several times in the portion retrieved from the database; and "Pa" is a probability of ambiguity of choice, given by N_app/nb_res.

The priority level "Priority" of each criterion is predefined at the initialization step 10, and from this an initialization Vt_init of the ordered set of query criteria Vt is deduced.

In step 11, for a current iteration, the user is prompted to supply data enabling the application to query the current portion retrieved from the database in accordance with the said data communicated by the user, based on the ordered set of query criteria Vt. Depending on the system, there may be several modes in which this prompt is expressed, for example voice mode, text mode, graphical mode, etc. Data structures are also worked out thereby enabling a search of results based on data communicated by the user. The data structures consist of a specific grammar for each data exchange mode and a function capable of applying this specific grammar. For the first iteration, these specific grammars may be pre-calculated at each update of the database.

This step 11 is detailed below, for example when a voice platform 6 is available (equipped with a voice recognition system of course) in the case of accessing an address book. The specific grammar is therefore a voice grammar for the language used. Means 8 for applying the voice grammar are able to associate a vector index with a recognized orthographic form, and convert an orthographic form to its phonetic equivalent, for the language used. The hash table Hv of the vector Vcr has as entries character strings representing phonetic forms, equality between two phonetic forms being determined conventionally on the basis of equality of the character strings representing them. Hence, a component vector Vp is also used, having the following structure: (Fo, Vr), where:

Fo is a possible orthographic form for a phonetic form of an entry in the hash table Hv; and Vr is a component vector of structure (IDe, cr), where IDe is an identifier of the result record in the database.

Also used is a hash table Hp that associates a phonetic form with the index in the vector Vp corresponding to the result, that can be multiple, of the recognition of this phonetic form.

Based on the portion retrieved from the database 3 at the current iteration and on the list of criteria that can be used for the user input defined by the ordered set of query criteria Vt, the algorithm used consists in determining the vector Vp and the hash table Hp in order to construct a recognition grammar associating each possible orthographic entry with an index in the vector Vp, without there being two entries with different orthographic forms having an identical phonetic form, since two different orthographic forms with an identical phonetic form will end up occurring in the same component of the vector Vp, having as the orthographic form the first one encountered. Hence the algorithm is as follows:

```
For any record e of index IDe in the current portion retrieved from
the database:
    for any usable criterion cr of Vt:
        // calculate the orthographic form fo of the value of the criterion
        // cr of e and the phonetic form fp corresponding to fo:
            if cr is a mono-field criterion
            then
                fo is the value of the field of cr for e
                fp is the phonetic representation of fo
            else
                fo is the concatenation of values of different fields
                    of cr for e
                fp is the concatenation of phonetic representations
                    of values of fields cr for e, with reuse of phonetic
                    representations already applied in the case of
                    mono-field criteria
        if fp is not known in Hp
        then
            create a new entry for fp in Hp, corresponding to the index
                i in Vp, corresponding to a new entry ep in this vector.
                assign fo to the field Fo of ep (ep.Fo ←fo)
        else
            ep is the entry of index i in Vp, where i is the index
                corresponding to the entry fp of Hp
        add in the field Vr of ep an entry with {IDe, cr}
Construction of the grammar is:
for any entry ep of Vp
    associate the orthographic form of the field Fo of ep (ep.Fo) with
        the index of ep in Vp
```

When the voice platform 6 recognizes an orthographic form, it gives as the result its index i in Vp, from which the list of possible results contained in the field Vr of the vector Vp (Vp(i).Vr) will be obtained directly.

The user input step 12 is the response by the user to the prompt in step 11. The user may of course respond using a variety of data exchange modes. In the case of an address book, the user input may take the form of speaking aloud a name to be recognized, typing a name on a keyboard, or even choosing a photograph on a graphical interface.

Step 13 consists in translating the user input by means of the specific grammar for the data exchange mode used. The specific grammar then gives an index corresponding to recognition of the user input.

Next, step 14 consists in determining the new portion retrieved from the database 3, based on the current retrieved portion and on the index supplied in the previous step 13. The new retrieved portion is indicated by the vector Vr of the component of Vp having as index the said index supplied in step 13.

Step 15 then tests whether the number of results nb_res, i.e. the number of records in the new portion retrieved from the database, is greater than the predetermined maximum number NRMAX, and if this test is negative, i.e. if the number of result records is less than or equal to the predetermined maximum number NRMAX, then a successful outcome of the iterative step is reflected at step 16, since the number of results obtained is less than or equal to the predetermined maximum number NRMAX. On the other hand, if the result of the test in step 15 is positive, the ordered set of query criteria Vt for a possible subsequent iteration is determined at step 17.

The ordered set of criteria Vt is determined in step 17 using the following algorithm:

```
// determination of the ordered set of criteria Vt
// elimination of criteria already used
for any result component r of Vr:
    if (the component Alw_Usable of the criterion component cr of the
            result r (r.cr.Alw_Usable) has the value false)
    then
        assign the value false to the component Usable of the criterion
            component cr of the result r (r.cr.Usable ←false)
    end if
end for
// resetting of the variables of the remaining criteria
for any criterion component cr of the criteria vector Vcr:
    if (the component Alw_Usable of the criterion cr (cr.Alw_Usable)
            has the value false and the component Usable (cr.Usable)
            has the value true)
    then
        empty the hash table Hv of the criterion cr
        assign the value zero to the total number of appearances N_app
            of the criterion cr (cr.N_app←0)
    end if
end for
// determination of data: hash table Hv, total number of appearances
// N_app, probability of ambiguity of choice Pa of each
// of the usable criteria.
let Vt be an ordered set of criteria
    for any criterion cr of the criteria vector Vcr:
        if (the component Alw_Usable of the criterion cr (cr.Alw_Usable)
                has the value true)
        then
            insert the criterion cr in the set Vt
        else
            if (the component Usable of the criterion cr (cr.Usable)
                    has the value true)
            then
                for any result r of the vector Vr
                    if (the value valcr corresponding to the criterion or in
                            the record of the result r is already present in the
                            hash table component Hv of cr (cr.Hv))
                    then
                        // multiple value
                        if (the number of occurrences of the value valcr in
                                the hash table component Hv of the criterion
                                cr (cr.Hv[valcr]) is 1
                        then
                            // first time that this
                            // multiple value is identified
                            // its first occurrence
                            // must be counted
                            increment by 1 the number of appearances N_app
                                of the criterion cr (cr.N_app←cr.N_app+1)
                        end if
                        // the new occurrence is counted
                        increment by 1 the number of appearances N_app
                            of the criterion cr (cr.N_app←cr.N_app+1)
                        increment by 1 the number of appearances of the
                        value valcr of the criterion cr in its hash table Hv
                        (cr.Hv[valcr]←cr.Hv[valcr]+1)
                    else
                        insert this value valcr in the hash table Hv of the
                            criterion cr, associating with it the value 1 as the
                            number of
                                occurrences
                    end if
                    if (the number of entries in the hash table Hv of the
                            criterion cr is greater than 1)
                    then
                        // update the probability of ambiguity Pa of the criterion
                        cr assign to the probability of ambiguity Pa of the
                        criterion cr the quotient of the total number of
                        appearances N_app and the number of entries in the
                        vector Vr (cr.Pa←cr.N_app)
                        if (the probability of ambiguity Pa is less than or equal
                                to a predetermined maximum probability PAMAX
                                (cr.Pa≦PAMAX))
                        then
                            insert the criterion cr in the set Vt
                        end if
                    else
                        assign the value false to the component Usable of the
                            criterion cr (cr.Usable←false)
                    end if
                end for
            end for
// the set Vt is sorted to produce an ordered set, by using
// the following function for comparing two criteria c1 and c2:
if (the component Alw_Usable of c1 has the value true or the
        component Alw_Usable of c2 has the value true)
then
    place c1 before c2 or c2 before c1 depending on their
    predetermined components Priority
else
    if (the probability of ambiguity component of criterion c1 is
            less than the probability of ambiguity component of
            criterion c2 (c1.Pa<c2.Pa))
    then
        place c1 before c2
    else
        if (the probability of ambiguity component of criterion c2 is
                less than the probability of ambiguity component of
                criterion c1 (c2.Pa<c1.Pa))
        then
            place c1 before c2
        else
            if (the size of the hash table Hv of criterion c1 is greater
                    than the size of the hash table Hv of criterion c2
                    (c1.Hv>c2.Hv))
            then
                place c1 before c2
            else
                if (the size of the hash table Hv of criterion c2 is greater
                        than the size of the hash table Hv of criterion
                        c1 (c2.Hv>c1.Hv))
                then
                    place c2 before c1
                else
                    classify the two criteria according to their
                    predetermined priority components
                end if
            end if
        end if
    end if
end if
```

A description will now follow of a detailed example of how the invention operates, using as an example a service for accessing an address book by voice (the system therefore includes a voice platform).

The address book is for example:

| ID | First name | Surname | Nickname | Town | Group | Photo | Audio |
|----|------------|---------|----------|---------|---------|-------|--------|
| 1 | Jean-Michel | Martin | Jean_mi | Lannion | Sports | @ph1 | @file1 |
| 2 | Nicolas | Dupond | Nicolas | Lannion | Work | @ph2 | @file2 |
| 3 | Michelle | Martin | Mimi | Paris | Friends | @ph3 | @file3 |
| 4 | Jean | Michel | Jean-mi | Metz | Sports | @ph4 | @file4 |
| 5 | Nicolas | Dupont | Nico | Paris | Family | @ph5 | @file5 |
| 6 | Michelle | Chemin | Lili | Lannion | Work | @ph6 | @file6 |
| 7 | Jean | Michelle | Ze boss | Nice | Sports | @ph7 | @file7 |
| 8 | Jean-Michel | Duc | Jean-mi | Metz | Sports | @ph8 | @file8 |

In this example the maximum number of criteria NCMAX is three (NCMAX=3).

At step 10, the criteria vector Vcr is initialized by means of a predetermined criteria vector Vcr_init:

```
Vcr=Vcr_init=( c1={ Priority=2, Lif={First name}, Usable=true,
                    Alw_Usable=false, Hv={}, N_app=0, Pa=0 },
               c2={ Priority=1, Lif={Surname}, Usable=true,
                    Alw_Usable=false, Hv={}, N_app=0, Pa=0 },
               c3={ Priority=3, Lif={First name   Surname}, Usable=true,
                    Alw_Usable=false, Hv={}, N_app=0, Pa=0 },
               c4={ Priority=4, Lif= {Nickname}, Usable=true,
                    Alw_Usable=false, Hv={}, N_app=0, Pa=0 },
               c5={ Priority=5, Lif={Town}, Usable=true,
                    Alw_Usable=false, Hv={}, N_app=0, Pa=0 },
               c6={ Priority=6, Lif={Group}, Usable=true,
                    Alw_Usable=false, Hv={}, N_app=0, Pa=0 })
```

Hence the ordered set Vt is immediately initialized by a set Vt_init deduced directly from the values of the Priority field of the vector Vcr.

We immediately deduce from this: Vt={c2, c1, c3}, where c1={First name}, c2={Surname}, and c3={First name, Surname}.

Next, the iterative step begins with step 11; the hash table Hp is determined, associating a phonetic form with the index in Vp corresponding to the result, which may be a multiple result, of the recognition of this phonetic form, the voice recognition grammar, and the vector Vp:

```
Hp=     Σä mifeɪ → 0
        Nik{ (o) (ao) }la → 1
        Mifeɪ → 2
        Σä → 3
        MaRtë → 4
        Dypö → 5
        f(θ)më → 6
        dyc → 7
        Σä mifeɪ maRtë → 8
        Nik{ (o) (ao) }la dypö → 9
        mifeɪ maRtë → 10
        mifeɪ f(θ)më → 11
        Σä mifeɪ dyc → 12
``` voice recognition grammar:
jean-michel→0
nicolas→1
michelle→2
jean→3
martin→4
dupond→5
chemin→6
duc→7
jean-michel martin→8
nicolas dupond→9
michelle martin→10
michelle chemin→11
jean-michelle duc→12 and the vector Vp is:

```
Vp = (0: {Fo= "jean-michel", Vr=({IDe=1, cr={First name}},
        {IDe=8, cr={First name}},
        {IDe=4, cr={First name, Surname}},
        {IDe=7, cr={First name, Surname}})},
   1: {Fo= "nicolas", Vr=({IDe=2, cr={First name}},
        {IDe=5, cr={First name}})},
   2: {Fo= "michelle", Vr=({IDe=3, cr={First name}},
        {IDe=6, cr={First name}}, {IDe=4, cr={Surname}},
        {IDe=7, cr={Surname}})},
   3: {Fo= "jean", Vr=({IDe=4, cr={First name}},
        {IDe=7, cr={First name}})},
   4: {Fo= "martin", Vr=({IDe=1, cr= {Surname}},
        {IDe=3, cr={Surname}})},
   5: {Fo= "dupond", Vr=({IDe=2, cr={Surname}},
        {IDe=53, cr={Surname}})},
   6: {Fo= "chemin", Vr=({IDe=6, cr={Surname}})},
   7: {Fo= "duc", Vr=({IDe=8, cr={Surname}})},
   8: {Fo= "jean-michel martin",
        Vr=({IDe=1, cr={First name, Surname}})},
   9: {Fo= "nicolas dupond",
        Vr=({IDe=2, cr={First name, Surname}},
            {IDe=5, cr={First name, Surname}})},
   10: {Fo= "michelle martin",
        Vr=({IDe=3, cr={First name, Surname}})},
   11: {Fo= "michelle chemin",
        Vr=({IDe=6, cr={First name, Surname}})},
   10: {Fo= "jean-michel duc",
        Vr=({IDe=8, cr={First name, Surname}})} )
```

Step 11 ends with the prompt to the user for input; in this example, the system prompts the user via the voice platform 6 and the telecommunication terminal tc: "Say the surname, or the first name, or the first name followed by the surname of the person to contact". This prompt reflects the three criteria of the ordered set Vt.

The user then says "Jean-michel". Assuming that the voice platform 6 has successfully recognized "Jean-michel", it returns index 0 of the voice grammar.

Next, at step 14, the new portion retrieved from the database 3 is determined, given by the vector Vr of the entry 0 of the vector Vp:

```
Vr = (    {IDe=1, cr={First name}},
          {IDe=8, cr={First name}},
          (IDe=4, cr={First name, Surname}},
          {IDe=7, cr={First name, Surname}} )
```

There are many results, i.e. the records having identifiers IDe 1, 8, 4 and 7, of which the first two are selected by first name, and the other two by first name followed by surname. The new portion retrieved from the database 3 is therefore the following:

| ID | First name | Surname | Nickname | Town | Group | Photo | Audio |
|----|------------|---------|----------|---------|--------|-------|--------|
| 1 | Jean-Michel | Martin | Jean_mi | Lannion | Sports | @ph1 | @file1 |
| 4 | Jean | Michel | Jean-mi | Metz | Sports | @ph4 | @file4 |
| 7 | Jean | Michelle | Ze boss | Nice | Sports | @ph7 | @file7 |
| 8 | Jean-Michel | Duc | Jean-mi | Metz | Sports | @ph8 | @file8 |

There are still several results, and in this example we have a predetermined maximum number of responses NRMAX of 1 (NRMAX=1), since at the end only one response is sought.

At step 15, the test is positive, i.e. the number of responses nb_res is greater than maximum number allowed NRMAX.

So we proceed to step 17 at which the new ordered set Vt of criteria is determined for refining the results at a possible subsequent iteration.

The criteria vector Vcr is updated, giving:

```
Vcr = (   c1= {Priority=2, Lif={First name}, Usable=false,
             Alw_Usable=false, Hv={}, N_app=0, Pa=0},
         c2= {Priority=1, Lif={Surname}, Usable=true,
             Alw_Usable=false, Hv={MaRtë→1, Mifel→2,
             dyc→1}, N_app=2, Pa=2/4=1/2},
         c3= {Priority=3, Lif={First name, Surname}, Usable=false,
             Alw_Usable=false, Hv={}, N_app=0, Pa=0},
         c4= {Priority=4, Lif={Nickname}, Usable=true,
             Alw_Usable=false, Hv={Σämi→3, zebos→1},
             N_app=3, Pa=3/4},
         c5= {Priority=5, Lif={Town}, Usable=true,
             Alw_Usable=false, Hv={laniö→1, mes→2,
             nis→1}, N_app=2, Pa=2/4=1/2},
         c6= {Priority=6, Lif={Group}, Usable=false,
             Hv={spó→4}, N_app=4, Pa=1 } )
```

The set of query criteria Vt can therefore no longer contain criteria c1, c3 and c6, since their components Usable have the value false. Note that the component Usable of c6 has the value false because there is only one distinct value for the entry in the hash table component Hv of c6. Furthermore, Vt cannot include the criterion c4 since this criterion is not sufficiently discriminating: its probability of ambiguity Pa is ¾ which is greater than a predetermined maximum value PAMAX, taken to be 0.5 in this example.

Next, the set of query criteria Vt are ordered, as described earlier, and the set of criteria is obtained:

```
Vt = { c2, c5 }, in which:
c2 = {Priority=1, Lif={Surname}, Usable=true,
     Alw_Usable=false, Hv={MaRtë→1,
     Mifel→2, dyc→1}, N_app=2, Pa=2/4=1/2},
c5 = {Priority=5, Lif={Town}, Usable=true,
     Alw_Usable=false, Hv={laniö→1, mes→2,
     nis→1}, N_app=2, Pa=2/4=1/2)
```

Next, at step 18, a test is performed to check whether the ordered set Vt is empty. This is not case here, and so we proceed to the second iteration in the process, i.e. to step 11.

Thus, the results are refined using the criteria c2 (surname) and c5 (town), with the following variables:

```
Hp=      MaRtë → 0
         Mifel → 1
         dye → 2
         laniö → 3
```

```
         mes → 4
         nis → 5
``` voice recognition grammar:
- martin→0
- michel→1
- duc→2
- lannion→3
- metz→4
- nice→5

```
Vp = (   0: {Fo= "martin", Vr=({IDe=1, cr={Surname}})},
         1: {Fo= "michel", Vr=({IDe=4, cr={Surname}},
             {IDe=7, cr={Surname}})},
         2: {Fo= "duc", Vr=({IDe=1, cr={Nickname}})},
         3: {Fo= "lannion", Vr=({IDe=1, cr={Town}})},
         4: {Fo= "metz", Vr=({IDe=4, cr={Town}},
             {IDe=8, cr={Town}})},
         5: {Fo= "nice", Vr=({IDe=7, cr={Town}})} )
```

Step 11 ends with the user input prompt. In this iteration, the system prompts the user via the voice platform 6 and the telecommunication terminal tc: "Say the surname or the town of the person to contact". This prompt reflects the two criteria of the ordered set Vt. The strategy to be adopted may depend on the number of different values of a criterion; for example, if this number is less than a predetermined number, they can be listed rather than posing an open question. Likewise, if the specific platform fails several times in a row to recognize a response of one of the criteria proposed, it can specifically request one of the other criteria proposed.

At step 12, the user says "michel". It is assumed that the voice platform has correctly recognized "michel". At step 13, index 1 of the voice grammar is identified.

The portion retrieved from the database is then determined at step 14, based on the vector Vr of the component of index 1 of the vector Vp:

Vr=({IDe=4, cr={Surname}}, {IDe=7, cr={Surname}})

So the new portion retrieved from the database is:

| ID | First name | Surname | Nickname | Town | Group | Photo | Audio |
|----|------------|---------|----------|------|--------|-------|--------|
| 4 | Jean | Michel | Jean-mi | Metz | Sports | @ph4 | @file4 |
| 7 | Jean | Michelle | Ze boss | Nice | Sports | @ph7 | @file7 |

Again, there are several results. Since NRMAX is 1, the test of step 15 is positive; so we proceed to step 17 at which the new ordered set Vt of criteria is determined for refining the results at a possible subsequent iteration.

The criteria vector Vcr is updated, giving:

```
Vcr = ( c1= {Priority=2, Lif={First name}, Usable=false,
            Alw_Usable=false, Hv={}, N_app=0, Pa=0},
        c2= {Priority=1, Lif={Surname}, Usable=false,
            Alw_Usable=false, Hv={}, N_app=0, Pa=0},
        c3= {Priority=3, Lif={First name, Surname}, Usable=false,
            Alw_Usable=false, Hv={}, N_app=0, Pa=0},
        c4= {Priority=4, Lif={Nickname}, Usable=true,
            Alw_Usable=false, Hv={ Σämi→1, zebos→1 },
            N_app=0, Pa=0},
        c5= {Priority=5, Lif={Town}, Usable=true,
            Alw_Usable=false, Hv={ mes→1, nis→1 },
            N_app=0, Pa=0},
        c6= {Priority=6, Lif={Group}, Usable=false,
            Hv={spó→4}, N_app=4, Pa=1} )
```

The set of query criteria Vt can therefore no longer contain criteria c1, c2, c3 and c6, since their components Usable have the value false. After criteria c4 and c5 are sorted, as described earlier, we have:

```
Vt= { c4, c5 } , in which:
    c4= {Priority=4, Lif={Nickname}, Usable=true,
        Alw_Usable=false, Hv={ Σämi→1,
        zebos→1}, N_app=0, Pa=0},
    c5 = {Priority=5, Lif={Town}, Usable=true,
        Alw_Usable=false, Hv={mes→1, nis→1,
        nis→1}, N_app=0, Pa=0}
```

Next, at step 18 a test is performed to check whether the ordered set Vt is empty. This is not the case here, and so we proceed to the third iteration in the process, i.e. to step 11.

Thus, the results are refined using the criteria c4 (nickname) and c5 (town), with the following variables:

```
Hp=         Σämi → 0
            zebos → 1
            mes → 2
            nis → 3
``` voice recognition grammar:

```
    jean-mi → 0
    ze boss → 1
    metz → 2
    nice → 3
Vp = ( 0: {Fo= "jean-mi", Vr=({IDe=4, cr={Nickname}})},
    1: {Fo= "ze boss", Vr=({IDe=7, cr={Nickname}})},
    2: {Fo= "metz", Vr=({IDe=4, cr={Town}})},
    3: {Fo= "nice", Vr=({IDe=7, cr={Town}})} )
```

The system may then ask to specify the nickname or the town of the person to be contacted, or directly whether "jean-mi" who lives in Metz or "ze boss" who lives in Nice is to be contacted.

At step 12, the user says "ze boss", and it is assumed that the voice platform has correctly recognized "ze boss".

The translation using the specific grammar at step 13 gives the index 1.

Then, at step 14, the new portion retrieved from the database 3 is determined, given by the vector Vr of entry 1 of the vector Vp:

Vr=({IDe=7, cr={Nickname}})

There is now only one result, and therefore the test at step 15 is negative. Therefore we proceed to step 16 reflecting success, and the system may now indicate to the user the contact details of the person to be contacted.

Thus by virtue of the invention it is possible to reduce the number of results obtained when querying a multimedia database, by successive refinements, by means of an iterative step.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. Multimodal method for querying a multimedia database from a telecommunication terminal, wherein the database is queried using an iterative step in which, at the current iteration, a portion, retrieved from the database and which is a subset of the portion retrieved at the previous iteration, is determined using an ordered set of query criteria worked out at the previous iteration if the current iteration is subsequent to the first iteration and at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration if the current iteration is subsequent to the first iteration;

wherein said ordered set of query criteria being selected from the components of the criteria vector and being determined so as to reduce the number of responses supplied at successive iterations respectively, and wherein the components of the criteria vector have the following structure:

(Priority; Lif; Usable; Alw_Usable; Hv; N_app)

where:

"Priority" is an integer that determines the order of priority for proposing the criterion;

"Lif" is a list of identifiers of fields of the database forming the query criterion;

"Usable" is a Boolean number that determines, during the iterations, whether the criterion can still be used;

"Alw_Usable" is a Boolean number that determines whether the criterion can always used, at each iteration, if it is desired that a criterion remains usable all the time;

"Hv" is a hash table in which each unique value of the criterion from the records is associated with the number of occurrences of this value; and "N_app" is the total number of appearances of values of the criterion appearing several times in the portion retrieved from the database 2. Method according to claim 1, wherein the elements of the ordered set of query criteria are selected from the components of the criteria vector, the number of elements selected being less than or equal to a predetermined number.

3. Method according to claim 2, wherein said initialization step includes steps in which:
   the criteria vector, to which is assigned the value of a predetermined vector, is initialized;
   the portion retrieved from the database, to which is assigned the complete database, is initialized; and
   the ordered set of query criteria, to which ordered set is assigned the value of an ordered set that is a function of the initialized criteria vector, is initialized.

4. Method according to claim 1, wherein, at the iterative step of querying the database, before determining the ordered set of query criteria needed for the possible subsequent iteration, the portion retrieved from the database is queried, and in response, a new portion retrieved from the database is obtained.

5. Method according to claim 4, wherein, at the current iteration, a query is made based on information supplied by a telecommunication terminal user, in response to a prompt for information depending on the said ordered set of query criteria.

6. Method according to claim 5, wherein the prompts for information and the corresponding responses are executed in any mode from a predetermined set of information exchange modes, each mode in the predetermined set of modes using means capable of comparing the information supplied by the user and the values of the predetermined query criteria for the records in the portion retrieved from the database.

7. Method according to claim 6, wherein the information exchange modes include a voice mode and/or a graphical mode and/or a text mode.

8. Method according to claim 1, wherein the iterative step is completed when the number of responses to the current iteration, which is the number of records in the portion retrieved from the database, is less than or equal to a predetermined maximum number, or when the ordered set of query criteria is empty.

9. Method according to claim 1, wherein, at each iteration, the ordered set of query criteria is determined, for a possible subsequent iteration, from the criteria vector made up of characteristic criteria components, where a component represents a criterion and comprises:
   a priority level for proposing the criterion represented;
   a list of identifiers of fields of the database forming the query criterion represented;
   a Boolean that determines whether the criterion represented can be used at the current iteration;
   a Boolean that determines whether the criterion represented can be used at any iteration;
   a hash table in which each unique value of the criterion represented, from the records in the portion retrieved from the database, is associated with the number of records in which this value appears;
   a total number of appearances of values of the criterion appearing several times in the portion retrieved from the database; and
   a probability of ambiguity of choice by the user equal to the ratio of the total number of ambiguous values to the total number of values of the portion retrieved from the database.

10. Method according to claim 9, wherein the criteria of the said ordered set of query criteria have a probability of ambiguity of choice less than or equal to a predetermined maximum probability of ambiguity.

11. Multimodal query system for querying a multimedia database from a telecommunication terminal, the said system comprising:
   a CPU;
   a data memory coupled to the CPU; and
   a system memory coupled to the CPU, wherein the system memory is configured to store one or more computer programs executable by the CPU;
   a content platform supporting the said database;
   a plurality of independent platforms each dedicated to a particular data exchange mode, the elements of the system having means for communicating with each other over a communication network;
wherein the computer programs are executable to implement a method for querying a multimedia database from a telecommunication terminal, the method comprising implementing an iterative step, wherein at the current iteration, a portion, retrieved from the database and which is a subset of the portion retrieved at the previous iteration, is determined using an ordered set of query criteria worked out at the previous iteration if the current iteration is subsequent to the first iteration and at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration if the current iteration is subsequent to the first iteration; wherein said ordered set of query criteria being selected from the components of the criteria vector and being determined so as to reduce the number of responses supplied at successive iterations respectively, and
wherein the components of the criteria vector have the following structure:
   (Priority; Lif; Usable; Alw_Usable; Hv; N_app)
   where:
      "Priority" is an integer that determines the order, of priority for proposing the criterion;
      "Lif" is a list of identifiers of fields of the database forming the query criterion;
      "Usable" is a Boolean number that determines, during the iterations, whether the criterion can still be used;
      "Alw_Usable" is a Boolean number that determines whether the criterion can always used, at each iteration, if it is desired that a criterion remains usable all the time;
      "Hv" is a hash table in which each unique value of the criterion from the records is associated with the number of occurrences of this value; and
      "N_app" is the total number of appearances of values of the criterion appearing several times in the portion retrieved from the database.

12. Computer program stored on a data storage medium, wherein it includes instruction codes designed to implement, when it is executed within a processing module, a multimodal method for querying a multimedia database, wherein the database is queried using an iterative step in which,
   at the current iteration, a portion, retrieved from the database and which is a subset of the portion retrieved at the previous iteration, is determined using an ordered set of query criteria worked out at the previous iteration if the current iteration is subsequent to the first iteration and at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration if the current iteration is subsequent to the first iteration;

wherein said ordered set of query criteria being selected from the components of the criteria vector and being determined so as to reduce the number of responses, and wherein the components of the criteria vector have the following structure:

(Priority; Lif; Usable; Alw_Usable; Hv; N_app)

where:
"Priority" is an integer that determines the order of priority for proposing the criterion;
"Lif" is a list of identifiers of fields of the database forming the query criterion;
"Usable" is a Boolean number that determines, during the iterations, whether the criterion can still be used;
"Alw_Usable" is a Boolean number that determines whether the criterion can always used, at each iteration, if it is desired that a criterion remains usable all the time;
"Hv" is a hash table in which each unique value of the criterion from the records is associated with the number of occurrences of this value; and
"N_app" is the total number of appearances of values of the criterion appearing several times in the portion retrieved from the database.

13. Multimodal query system for querying a multimedia database from a telecommunication terminal, the said system comprising:

a CPU;

a data memory coupled to the CPU; and a system memory coupled to the CPU, wherein the system memory is configured to store one or more computer programs executable by the CPU, where the computer programs are executable to implement a method for querying the multimedia database from a telecommunication terminal, the method comprising:

implementing an iterative step wherein at the current iteration a portion, retrieved from the database and which is a subset of the portion retrieved at the previous iteration, is determined using an ordered set of query criteria worked out at the previous iteration if the current iteration is subsequent to the first iteration and at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration if the current iteration is subsequent to the first iteration; wherein said ordered set of query criteria being selected from the components of the criteria vector and being determined so as to reduce the number of responses supplied at successive iterations respectively, and wherein the components of the criteria vector have the following structure:

(Priority; Lif; Usable; Alw_Usable; Hv; N_app)

where:
"Priority" is an integer that determines the order of priority for proposing the criterion;
"Lif" is a list of identifiers of fields of the database forming the query criterion;
"Usable" is a Boolean number that determines, during the iterations, whether the criterion can still be used;
"Alw_Usable" is a Boolean number that determines whether the criterion can always used, at each iteration, if it is desired that a criterion remains usable all the time;
"Hv" is a hash table in which each unique value of the criterion from the records is associated with the number of occurrences of this value; and
"N_app" is the total number of appearances of values of the criterion appearing several times in the portion retrieved from the database.

14. Telecommunication terminal for querying a multimedia database, the telecommunication terminal comprising:

a CPU;

a data memory coupled to the CPU;

means for data communication with a communication network; and a system memory coupled to the CPU, wherein the system memory is configured to store one or more computer programs executable by the CPU, where the computer programs are executable to implement a method for querying the multimedia database from a telecommunication terminal, the method comprising:

implementing an iterative step wherein at the current iteration, a portion, retrieved from the database and which is a subset of the portion retrieved at the previous iteration, is determined using an ordered set of query criteria worked out at the previous iteration if the current iteration is subsequent to the first iteration and at a previous initialization step if the current iteration is the first iteration, and using a criteria vector comprising characteristic values of a predetermined set of query criteria for the portion retrieved from the database, the said criteria vector being initialized at the initialization step if the current iteration is the first iteration, and determined during the previous iteration if the current iteration is subsequent to the first iteration; wherein said ordered set of query criteria being selected from the components of the criteria vector and being determined so as to reduce the number of responses supplied at successive iterations respectively, and wherein the components of the criteria vector have the following structure:

(Priority; Lif; Usable; Alw_Usable; Hv; N_app)

where:
"Priority" is an integer that determines the order of priority for proposing the criterion;
"Lif" is a list of identifiers of fields of the database forming the query criterion;
"Usable" is a Boolean number that determines, during the iterations, whether the criterion can still be used;
"Alw_Usable" is a Boolean number that determines whether the criterion can always used, at each iteration, if it is desired that a criterion remains usable all the time;
"Hv" is a hash table in which each unique value of the criterion from the records is associated with the number of occurrences of this value; and
"N_app" is the total number of appearances of values of the criterion appearing several times in the portion retrieved from the database.

15. Telecommunication terminal according to claim 14, including a plurality of independent software platforms each dedicated to a particular data exchange mode.

* * * * *